United States Patent [19]

Matsumoto

[11] 4,336,548

[45] Jun. 22, 1982

[54] DROPLETS FORMING DEVICE

[75] Inventor: Shigeyuki Matsumoto, Kawasaki, Japan

[73] Assignee: Canon Kabushiki Kaisha, Tokyo, Japan

[21] Appl. No.: 162,531

[22] Filed: Jun. 24, 1980

[30] Foreign Application Priority Data

| | | | |
|---|---|---|---|
| Jul. 4, 1979 | [JP] | Japan | 54-84851 |
| Jul. 4, 1979 | [JP] | Japan | 54-84852 |
| Jul. 9, 1979 | [JP] | Japan | 54-87146 |

[51] Int. Cl.$^{3}$ .......... G01D 15/18

[52] U.S. Cl. .......... 346/140 R

[58] Field of Search .......... 346/140 PD

[56] References Cited

U.S. PATENT DOCUMENTS

| | | | |
|---|---|---|---|
| 4,243,994 | 1/1981 | Kobayashi et al. | 346/140 PD |
| 4,251,824 | 2/1981 | Hara et al. | 346/140 PD |

*Primary Examiner*—George H. Miller, Jr.

*Attorney, Agent, or Firm*—Fitzpatrick, Cella, Harper & Scinto

[57] ABSTRACT

A droplets forming device of a construction wherein a body of liquid to be introduced into a chamber connected with liquid droplets discharging orifice is heated at a heat generating section provided on a part of the chamber, and the thus heated body of liquid is discharged from the orifice in the form of droplets, and in which the surface in contact with the liquid at this heat generating section is made to have surface coarseness of from 0.05S to 2S measured in accordance with the Japanese Industrial Standard JIS B 0601.

27 Claims, 9 Drawing Figures

DROPLETS FORMING DEVICE

BACKGROUND OF THE INVENTION

1. Field of the Invention

This invention relates to a droplets forming device which discharges recording liquid, generally called "ink". More particularly, it is concerned with a droplet forming device applicable to the so-called "ink-jet recording system" which performs recording of an image with ink droplets.

2. Description of the Prior Art

Of various kinds of recording systems which are known, the so-called "ink-jet recording system" is recognized to be an extremely useful recording system. This ink-jet recording system is of a non-impact type which generates substantially no noise at the time of the recording, is able to perform recording a high speed recording, and yet is able to perform such recording on plain paper without requiring any particular image fixing treatment.

Various systems have heretofore been proposed for this ink-jet recording method, some of which have already been commercialized after repeated improvements, and some others are still under development for practical uses.

The ink-jet recording method performs recording of an image on an image recording member such as paper, etc. by sputtering or ejecting droplets of the recording liquid (hereinafter simply called "ink") by various working principles. This ink-jet recording method may be classified into the following two type.

The first type is the so-called "continuous system", in which small droplets of ink are continuously ejected from a nozzle (or nozzles), and only those ink droplets which are required for recording are selected out of the discharged droplets and guided to the surface of the recording member where they are adhered to complete the image recording. The other type is so-called "ink-on-demand system", in which the ink droplets are ejected or sputtered from the nozzles toward the surface of the recording member only when recording becomes necessary.

For putting this latter method into practice, there has already been proposed an ink-jet head in a laid-open Japanese patent application No. 54-51837. The ink-jet head device as proposed in this laid-open patent application comprises an ink; chamber having nozzles for ejecting liquid ink feeding reservoir; a heat generating member to heat the liquid ink in the ink chamber to develop foam within the ink chamber and to cause a pressure increase in the ink; and a cooling device to cool the abovementioned heat generating member. This disclosed invention has, as its principal technical aim, the prevention of dropping of ink unexpectedly from the nozzles as well as clogging of the nozzles.

Such ink-jet recording system, however, still has various disadvantages in view of the fact that the device should inevitably use the cooling device; represented by a peltier effect element, in addition to the heat generating member to both be driven for ejecting the ink droplets. In other words, the following inconveniences can be pointed out in the abovementioned system which essentially requires a cooling device.

Firstly, as it is necessary to cover substantially the entire region of the ink-jet head with the cooling device, the construction of the actual device inevitably becomes complicated, and much more labor and skill are required for its manufacture.

Secondly, since electric power should be used for operating the Peltier effect element (Cooling device), besides the operation of the heat generating member, the recording system is disadvantageous in respect of its energy efficiency.

Thirdly, considerably high technology is required for efficiently controlling the heat applying and heat absorbing actions by operation of the heat generating member and the cooling device, respectively, practice of which also accompanies considerable difficulty.

In the fourth place, since the ink in the ink chamber is rapidly cooled or over-cooled an many occasions by the cooling device, there tends to readily occur readily excessive backwardness of the meniscus at the tip end of the nozzles, which often invites failure in the ejection of the ink droplets.

In the fifth place, since the recording system repeats the heating operation and subsequent rapid cooling operation, the recording device is liable to be easily broken, hence the durability in a commercial device is not satisfactory.

SUMMARY OF THE INVENTION

In view of the foregoing, the present invention proposes a droplets forming device having an improved construction, which perfectly solves the serious disadvantages observed in the ink-jet system as disclosed in the abovementioned laid-open Japanese patent application No. 54-51837.

It is therefore an object of the present invention to provide a droplets forming device which performs image recording with high efficiency by ejecting ink droplets out of the nozzles due to heat action.

It is another object of the present invention to provide a droplets forming device having a prolonged operating life.

It is still another object of the present invention to provide a droplets forming device which is simple in construction, and secures stable ink discharge by heat action over a long period of time.

According to the present invention, in one aspect thereof, there is provided a droplets forming device of a construction, in which a body of liquid to be introduced into a chamber communicatively connected with liquid droplets discharging orifice is heated at a heat generating section provided on a part of the chamber, and the thus heated body of liquid is discharged from the orifice in the form of droplets, and in which the heat generating section has, at least, a heat generating resistive body and a barrier layer to isolate the resistive body from the liquid, and further an interface of contact with the liquid in the heat generating section has a surface coarseness of from 0.05 S to 2 S measured in accordance with the Japanese Industrial Standard JIS B 0601.

According to the present invention, in another aspect thereof, there is provided a droplets forming device of a construction, wherein a body of liquid to be introduced into a chamber communicatively connected with liquid droplets discharging orifice is heated at a heat generating section provided on a part of the chamber, and the thus heated body of liquid is discharged from the orifice in the form of droplets, and in which the abovementioned heat generating section is constructed with a lamination of plurality of films formed by the vacuum deposition method, and the interface of contact with liquid at this heat generating section is made to have surface coarseness from 0.05 S to 2 S measured in accordance with the Japanese Industrial Standard JIS B 0601.

According to the present invention, it still another aspect thereof, there is provided a droplets forming device of a construction, wherein a body of liquid to be introduced into a chamber communicatively connected with liquid droplets discharging orifice is heated at a heat generating section provided on a part of the chamber, and the thus heated body of liquid is discharged from the orifice in the form of droplets, and in which the abovementioned heat generating section has a heat generating resistive body layer formed on a substrate, and the substrate has a surface coarseness of from 0.1 S to 5 S measured in accordance with the Japanese Industrial Standard JIS B 0601.

DESCRIPTION OF PREFERRED EMBODIMENTS

Figure 1:
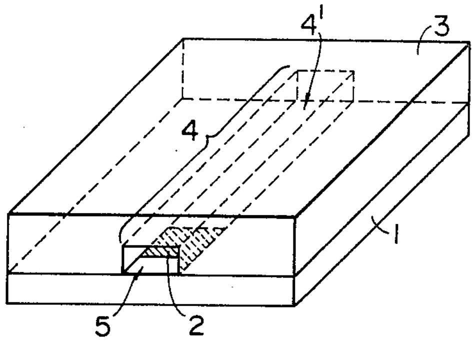
FIGS. 1 and 2 are respectively a perspective view and a side elevational view in longitudinal cross-section of the main part of the device of the present invention for explaining the principle of droplets ejection.

The ink-jet recording system by heat action according to the present invention adopts a heat generating resistive body in its implementing device, which is repeatedly driven in a state of its being in contact with the ink.

In this system, while the heat generating section represented by the heat generating resistive body is repeating the cycle of heating and cooling in the state of its being in contact with the ink, it tends to be chemically modified by oxidation, etc. to cause mechanical disorders, leading to deterioration in the function of the device. In addition, the ink is baked onto the surface of the heat generating section or electrolyzed to make it difficult to maintain an expected droplets discharging capability. Therefore, with a view to removing these inconveniences, there has been contemplated a way to dispose a thin film of an insulative material on the surface layer of the heat generating section, i.e., an interface of its contact with the ink, to avoid direct contact of the ink with the heat generating section. Incidentally, when the film to protect the heat generating section is disposed as mentioned above, since the film constitutes a barrier in respect of heat transmission, it should preferably be as thin as possible for satisfactory transmission of heat to the ink. On the other hand, however, so far as such barrier layer, or the protective thin film, is formed of inorganic substances such as, for example, $SiO_2$, $MgO$, $Al_2O_3$, $Ta_2O_3$, $TiO_2$, $ZrO_2$, etc. as has heretofore been done at the time of manufacturing the so-called "thermal head", there tends to occur such disadvantage that, as the film thickness becomes thinner and thinner, a differential portion in height between the electrode and the resistive body constituting the heat generating section becomes exposed outside, or defective portions such as pin-holes, etc. are left in the thin film per se. In such case, therefore, the primary function of the barrier layer becomes unable to be attained. Accordingly, it has heretofore been considered necessary that various contrivances be made, even at the sacrifice of the thermal conductivity to the ink to some extent, such that this barrier layer be formed to a thickness which does not allow the electrode and heat generating resistive body to be exposed outside, and the filling density of the barrier layer be increased so as to minimize the defects in the film.

Also, from another standpoint, the present inventors have made repeated studies and experiments, on the way of their making the present invention, as to the method of carrying out the droplets ejection by heat action with good efficiency. As the result of their studies and experiments, it has been recognized that, in the ink jet system due to heat action, the physical property of the surface of the heat generating section, inter alia, smoothness of the surface, constitutes an important factor to govern the efficiency in the droplets ejection. It goes without saying that the absence of the defects in the surface layer is desirable from the standpoint of sufficient protection of the heat generating section. According to the knowledge acquired by the present inventors, however, it has been revealed that, when the surface of the heat generating section has no film defects to a substantial degree and is highly smooth, the power consumption required for actuating the heat generating section to eject the ink droplets is apt to increase, and, when the surface of the heat generating section is properly coarsened, the energy efficiency for the droplets ejection becomes favorable (i.e., the power consumption required for actuating the heat generating section to eject the ink droplets decreases). Upon further scrutiny, it has also been found that, when the surface of the heat generating section has its surface coarseness of from 0.05 S to 2 S (measured in accordance with the Japanese Industrial Standard JIS B 0601), the energy efficiency of the droplets ejection becomes very favorable.

Thus, in the droplets forming device of the present invention which has been constructed by taking into consideration the aforementioned acquired knowledge, there instantaneously develops foam to cover substantially the entire region of the heat generating section, by the pressure action of which there takes place ejection of the ink droplets. In connection with this, when the ink is heated at this heat generating section, a great deal of small sized foam develops over substantially the entire surface of the heat generating section, after which this small foam as developed instantaneously gather at one place to form one large bubble. Such change in ink readily takes place, even when the heat generating section is driven in an unprecedented low temperature range. Accordingly, the droplets forming device according to the present invention does not require high temperature driving of the heat generating section as in the conventional device at the time of ejecting the droplets.

In the following, the present invention will be explained in detail in reference to the accompanying drawing showing preferred embodiments thereof.

Referring first to FIG. 1 showing the main part of the inventive device, particularly, its head section, the head section is constructed by joining a base plate or substrate 1 for setting the heat generating section with a separate base plate 3. Explaining in more detail, the surface of the heat generating section setting base plate 1 is provided with a heat generating section 2 as a heat applying section. For the material to construct the other base plate 3, there may be used glass, ceramic, heatresistant plastic, and so on. In this base plate 3, there are formed, in advance, a chamber 41, for accommodating ink before it is discharged, and a long groove 4 to construct an ink discharging orifice. The base plate 3 and the heat generating section setting base plate 1 are put together by adhesive agent into an integral whole after exact positioning of the heat generating section 2 and the groove 4.

In the following, brief explanations will be given as to the principle of ink droplet discharging by the device as illustrated in FIG. 1, in reference to FIG. 2 which is a longitudinal cross-sectional view of the groove 4 taken along the axial line thereof. Ink IK for recording is supplied into the chamber 4' in the direction as shown by an arrow mark. Now, when a signal is applied from a signal generating source (not shown) to the heat generating section 2 installed at a part of the chamber 4', the heat generating section 2 generates heat and imparts heat energy to the ink IK in its vicinity. The ink IK which has received the heat energy brings about changes in its state such as volume expansion, foam development, and so on in the vicinity of this heat generating section. As the result of such state changes, there takes place a change in pressure within the liquid chamber 4', which change is transmitted in the direction of the discharge orifice 5, whereby the ink IK is discharged therefrom in the form of small droplets 10. By adherence of the droplets 10 onto an arbitrary recording material such as paper, etc. (not shown), desired image recording can be effected. Incidentally, since the actual construction of the abovementioned heat generating section 2 is important in understanding the present invention, detailed explanations thereof will be given in the following.

Figure 2:
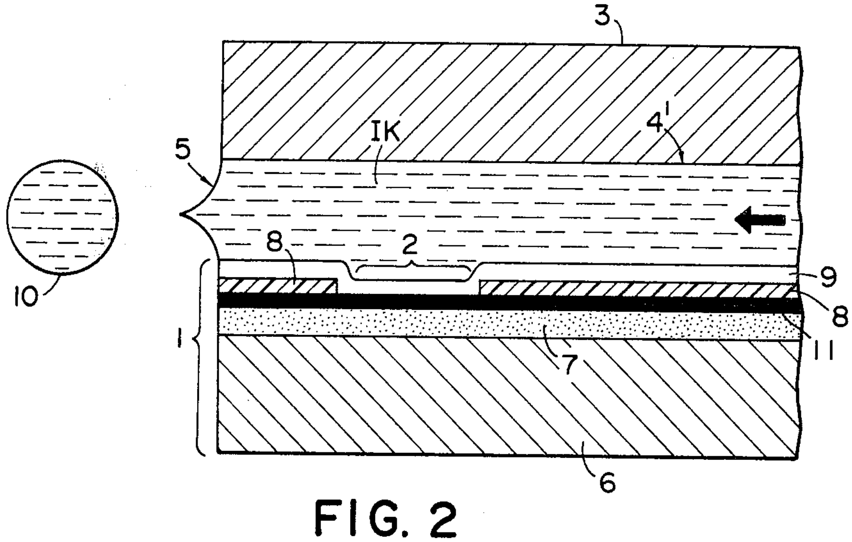

FIG. 2 schematically shows a layered structure of the heat generating section. This heat generating section 2 is constructed with a heat accumulating layer 7, a heat generating resistive body layer 11, an electrode 8 and a barrier layer 9 (also called "protective layer" in the subsequent description) which are laminated in the named order onto a substrate 6 having a predetermined surface coarseness by use of the vacuum film forming technique (also called "vacuum deposition method"). This patterned heat generating section 2 is of such a construction that it is exposed in the groove 4 through the barrier, or protective, layer 9. In the heat generating section 2, it is the protective layer 9, with which the ink IK is directly contacted. This protective layer 9 therefore prevents the heat generating resistive body layer 11 and the electrode 8 from being oxidized by direct contact with the ink IK, or, conversely, prevents the ink IK from being electrolyzed. It is, of course, permissible that such protective layer 9 be dispensed with, if such inconveniences will not possibly occur.

Of the abovementioned constituent elements, the substrate 6 is an extremely important element to govern the function and effect of the droplets forming device according to the present invention.

For the substrate 6 suitable for use in the present invention, there are several kinds of materials such as: sintered polycrystalline bodies such as various kinds of ceramics, alumina sintered plate, etc.; metals such as stainless steel, aluminum, platinum, etc.; molten quartz or sapphire, etc.

The surface property of this substrate 6 should be such that, as will be explained hereinafter, it has a predetermined range of coarseness to effectively attain the purpose of the present invention.

In case the sintered polycrystalline body is used, those having the crystal grain size of approximately 0.1 μm to 5 μm, and the surface coarseness of from 0.1 S to 5 S (as measured by a surface coarseness meter in accordance with the Japanese Industrial Standard JIS B 0601) are selected for use.

When metal plates and molten quartz plate or sapphire plate are used, it is desirable that they be used after the surface coarsening treatment being effected by use of abrasive sand, etc. so that its surface coarseness may be in a range of from 0.1 S to 5 S.

According to the present invention, the abovementioned surface property of the substrate 6 can also be reproduced, to a substantially the same degree, in the surface property of the heat generating section 2. As the result of this, there can be recognized such as effect that foam quickly develops in the ink IK in the vicinity of the heat generating section and the energy efficiency at that time becomes very favorable. It has additionally been recognized that the adhesive strength among these laminated thin films such as the heat accumulating layer 7, heat generating resistive body layer 11, electrode 8, protective layer 9, and so on to be formed on the substrate 6 becomes increased to make it difficult to exfoliate with the consequence that durability of the device as a whole remarkably increases and its operating reliability augments, in conjunction with the heat generating section 2 being able to be driven in a low temperature range.

According to further studies made by the present inventors, it has also been found out that particular advantages would accrue with respect to the abovementioned effects when the substrate 6 has its surface coarseness of from 0.1 S to 2 S (in accordance with the Japanese Industrial Standard JIS B 0601). It has further been found out that, when the surface coarseness of the substrate 6 exceeds 5 S and above, the durability of the device is remarkably lowered. As to the effect which results from constructing the heat generating section 2 as mentioned above, a more detailed explanation will be given hereinafter in reference to several examples thereof.

Effective materials for constructing the heat accumulating layer 7 are, for example: oxides of silicon, zirconium, tantalum, magnesium, aluminum, and so forth. Also, effective materials for constructing the heat generating resistive body layer 11 are, for example: boron-containing-compounds such as $HfB_2$, $ZrB_2$, etc.; those compound containing $Ta_2N$, Wi-Cr, $SnO_2$, or Pd-Ag, or Ru as the principal constituent, and further p-n junction semiconductive body such as Si-diffused resistive body semiconductor. For the electrode 8, there may be used thin metal film formed of aluminum, copper, gold, and so forth. For the material to constitute the protective layer 9, there are usually used inorganic matters such as $SiO_2$, MgO, $Al_2O_3$, $Ta_2O_5$, $TiO_2$, $ZrO_2$, and so on.

These constituent elements of the heat generating section 2 can be formed in film by utilizing techniques of the vacuum evaporation method, electron beam evaporation method, sputtering method, CVD method, gas-phase growth method, glow discharge method, and any other arbitrary vacuum deposition methods. It is desirable that these thin films be formed to have its heat resistance of approximately 300° C. and above. Thickness of the heat generating layer 7 to be formed by the vacuum deposition method should be determined appropriately in relation to the material quality of the substrate 6 and the heat generating resistive body layer 11. In general, however, it is selected in a range of from 0.01 μm to 50 μm, or preferably, from 0.1 μm to 30 μm. Thickness of the heat generating resistive layer 11 is generally selected in a range of from 1,000 Å to 4,000 Å or more preferably, from 1,500 A to 2,500 Å, or so, in consideration of the resistance value and durability of the layer. Further, a practical range of the protective layer 9 is from approximately 0.1 μm to 5 μm, or more preferably, from 0.3 μm to 3 μm.

Figure 4:
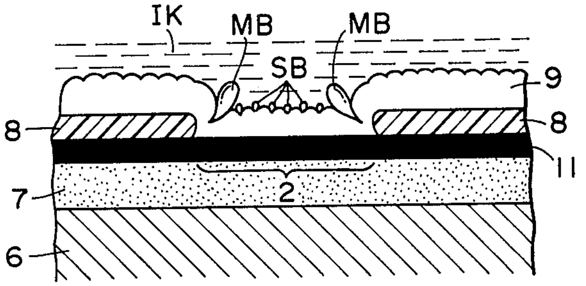
Figure 5:
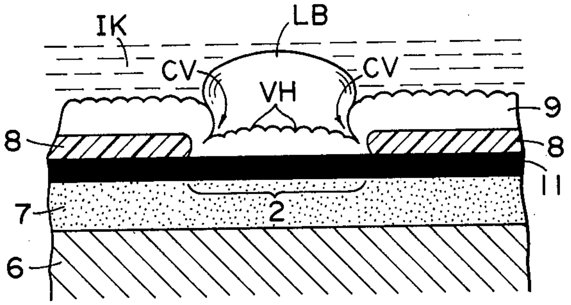

Here, more detailed explanations will be given as to the construction and function and the resulting effects of the heat generating section 2 in reference to FIGS. 3 to 5 which illustrate schematically the neighboring area of the heat generating section 2 shown in FIG. 2.

As mentioned in the foregoing, when each of the constituent elements of the heat generating section 2 (i.e., the heat accumulating layer 7, heat generating resistive layer 11, the electrode 8, and the protective layer 9, etc.) is formed by the vacuum deposition method, it is not possible to form the film having the filling density of 100% as the nature of this method, but voids which are called "micro-pores" would inevitably be left in the film as formed. On account of this, irrespective of whether the protective layer 9 is provided on the surface layer of the heat generating section 2, or not, there remains in the top surface of the heat generating section 2 (i.e., in the interface of contact between the ink IK and the heat generating section) wedge-shaped small cavities VH as shown in drawing. According to the vacuum deposition method, there can be obtained relatively easily, depending on the film forming conditions, a film having substantially uniform surface irregularities including the abovementioned small cavities VH formed over the entire surface thereof, i.e., a film having its surface coarseness of 0.05 S to 2 S (in accordance with the Japanese Industrial Standard JIS B 0601). Furthermore, according to the present invention, as mentioned above, when each of the constituent elements for the heat generating section 2 (i.e., the heat accumulating layer 7, the heat generating resistive body layer 11, the electrode 8, and the protective layer 9, etc) is formed by the vacuum deposition method followed by treatment to the surface layer of the heat generating section 2 as mentioned below, there can be more securely obtained the abovementioned desirable surface condition. That is, in the present invention, a layer having an appropriate surface coarseness is separately formed in addition to the surface layer having the abovementioned protective faculty. The method for forming such additional layer can be largely classified into the following two methods. The one is to subject the protective layer 9 per se to physical or chemical coarsening process to finish it to have appropriate surface coarseness, and the other is to attach a separate material onto the previously formed protective layer 9 until fine irregularities are formed thereon. Concrete methods for the surface-coarsening will be explained hereinbelow in further detail.

1. Sand blast abrasion method:

In this method, compressed air is blasted together with an abrasive agent against the surface to be coarsened, by which the surface of the protective layer can be uniformly coarsened. For the abrasive agent, those having the grain size of #300 to #1000 according to the Japanese Industrial Standard (exemplary articls under a tradenames of "Fujimi Abrasive Agent A and WA") are the most desirable, with which the surface coarseness can be easily made 0.5 S or below after the abrasion.

2. Buff abrasion method:

Although this method is primarily for the mirror-finishing of an object, it is also capable of coarsening the protective layer formed by the vacuum deposition method using an abrasive agent. For the abrasive agent, there may be used Cerox (product of Tohoku Kagaku Kinzoku, K.K.), Carborundum (supplied by Nagoya Kenmazai K.K.), Green Carbon FGC, NGC, and Fujimi Abrasive Agent WA (supplied by Fujimi Kenmazai K.K.) for good result. With this method, too, the surface coarseness after the abrasion is generally 0.5 S which is sufficient for the surface having foaming nuclei.

3. Spray method:

In this method, an irregular surface can be formed by spraying a liquid coating agent onto the protective layer through a spray nozzle in an extremely thin thickness followed by heat treatment thereof. The irregularity thus obtained on the layer surface is due to non-uniformity in the spraying as well as non-uniformity in wetting property of the protective layer. The liquid coating agent for the spray is generally selected from alcohol solution of alkyl silicate series compound (particularly, ethyl silicate), alcohol solution of alkyltitanate series compound, and others. After the heat treatment of the spray-coated film, there will be formed satisfactory foaming nuclei with the irregular surface layer of $SiO_2$, $TiO_2$, etc. thus obtained. The temperature for the heat treatment should desirably be from 300° C. to 600° C. in ordinary cases.

4. Etching method:

A thin film is formed by use of the vacuum deposition method over the entire surface of the protective film. The thus formed thin film is subjected to fine patterning by etching. This thin film and the end part of the protective film may constitute the bubbling point. Those materials that can be etched are usable for this purpose. They are all kinds of etchable metals, metal compounds, and organic substances. Considering peeling strength, the layer should preferably be as thin as possible, which is in a range of from 0.1 to 1.0 μm. Density of the pattern does not greatly affect the foaming.

Figure 3:
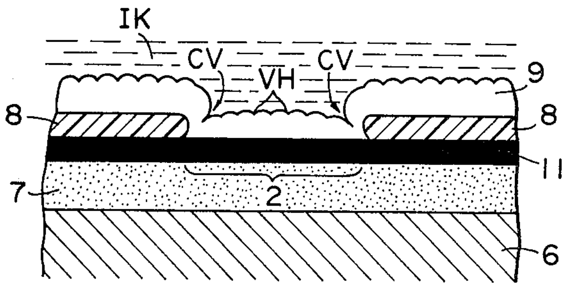
FIGS. 3 to 5 are schematic, enlarged side elevational views in longitudinal cross-section showing the main part of device according to the present invention.

In the above-described methods, the protective layer 9 is provided over the surface layer of the heat generating section 2 (i.e., the interface of contact between the heat generating section and the ink IK), and small cavities VH as shown in FIG. 3 are formed in considerable numbers and distributed substantially uniformly over the entire surface of the heat generating section 2. Also, as shown in FIG. 3, there are formed V-shaped cavities CV deeper than the abovementioned cavities VH on the surface layer of the heat generating section 2 at positions in the close vicinity of stepped portions between the heat generating resistive body layer 11 and the electrode 8. The cavities CV are developed due to the step coverage in the vacuum deposition method being 20 to 30% in general. When the heat generating section 2 generates heat in a state of its being in contact with the ink IK, the abovementioned cavities VH and the cavities CV function as the bubbling points and the ink IK starts boiling. In this instance, the largest bubbles MB occur in the cavities CV, while substantially uniform small bubbles SB develop in other cavities VH at the interface between the ink IK and the heat generating section. These bubbles further grow, and, after repeated integration, such integrated bubbles grown to a large bubble LB that covers almost the entire surface of the heat generating section 2, as shown in FIG. 5. In the droplets forming device according to the present invention, this large bubble LB increases the internal pressure in the (heat acting) chamber 4', thereby discharging ink.

As detailed in the foregoing, since so many bubbling points are formed on the surface of the heat generating section 2 according to the present invention, development of the bubbles occurring in the ink IK in contact with the bubbling points becomes rapid, and the energy efficiency becomes very favorable at that time. Moreover, in the present invention, since the development and growth of the large bubbles to discharge the ink droplets can be done easier than ever, not only the heat generating section 2 becomes able to be driven in a low temperature range, but also the principal structural portion of the heat generating section 2 (e.g., heat generating resistive body, electrode, etc.) can be perfectly isolated from the ink IK, whereby the device becomes less liable to cause deterioration in this function. On account of this, the durability of the device as a whole improves much more than ever, and its reliability increases, which is another effect to be derived from the present invention.

According to the repeated studies made by the present inventors, it has further been found out that, when the surface state of the generating section 2 is such that the surface coarseness ranges from 0.05 S to 2 S (in accordance with the Japanese Industrial Standard JIS B 0601), the abovementioned effects can be advantageously obtained. Furthermore, when the surface coarseness of the heat generating section 2 is from 0.05 S to 1 S, the optimum effect can be obtained from the practical standpoint.

In the following, several preferred examples of the present invention will be presented with a view to helping the reader of this specification understand more fully the effect to be derived from constructing the heat generating section 2 as mentioned in the foregoing. The effect derived from the present invention will be more clearly understood from these examples in conjunction with several comparative examples.

EXAMPLES 1 TO 8

Figure 6A:
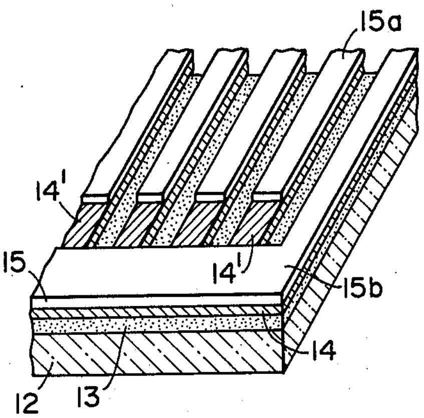
FIGS. 6A through 8 are respectively schematic perspective views and a cross-sectional view for explaining the embodiments of the present invention.

First of all, the heat generating section setting base plate for use in Examples 1 to 8 as well as Comparative Example 1 is prepared in the following manner. Incidentally, FIG. 6A shows an enlarged perspective view of the base plate.

Figure 6B:
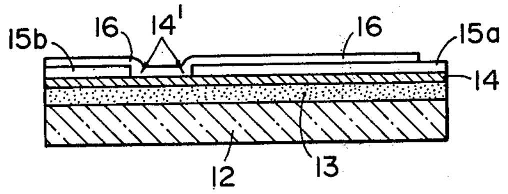

An $SiO_2$ heat accumulating layer 13 (5 μm thick), an $HfB_2$ heat generating resistive body layer 14 (800 Å thick) and an aluminum electrode layer 15 (5,000 Å) are formed on an alumina substrate 12. Thereafter, heat generating sections 14' (40 μm wide and 200 μm long) are formed by selective etching. Also, electrodes **15*a* and a common electrode 15*b* are formed by the etching. Further, as shown in FIG. 6B, $SiO_2$ is sputtered, to a thickness of 1.4 μm and with a filling density of 98% and above, onto the surface of the electrodes 15*a*, 15*b* and the heat generating section 14'. This $SiO_2$ coating is made a protective layer 16. Then, this protective layer 16** is subjected to treatments as shown in Table 1 below, thereby obtaining the heat generating section setting base plate for Examples 1 to 8 and the Comparative Example 1. The surface coarseness of the top surface layer is measured in accordance with JIS B 0601 for each of the heat generating section setting base plate, and the measured values are jointly shown in the Table 1.

Figure 7:
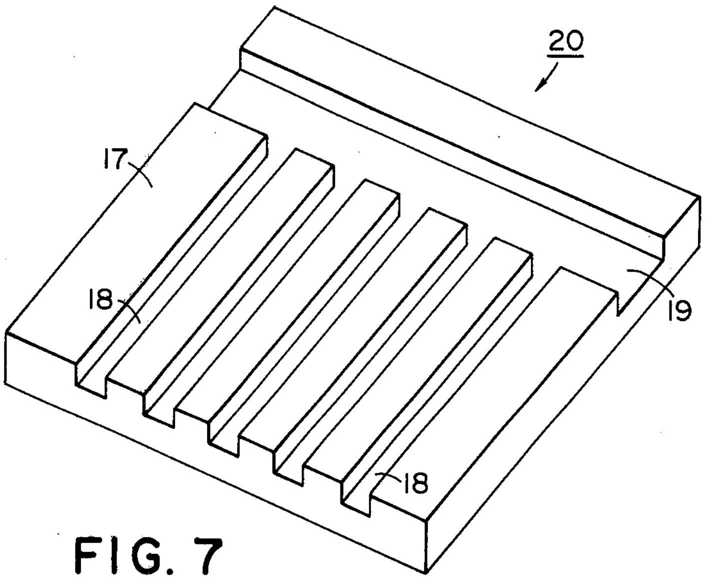

Separate from this a grooved plate 20 is also prepared by forming on a glass plate 17 a plurality of grooves 18 (40 μm wide and 40 μm deep) and a groove to constitute a common ink chamber 19, as shown in FIG. 7, with use of a micro-cutter.

Figure 8:
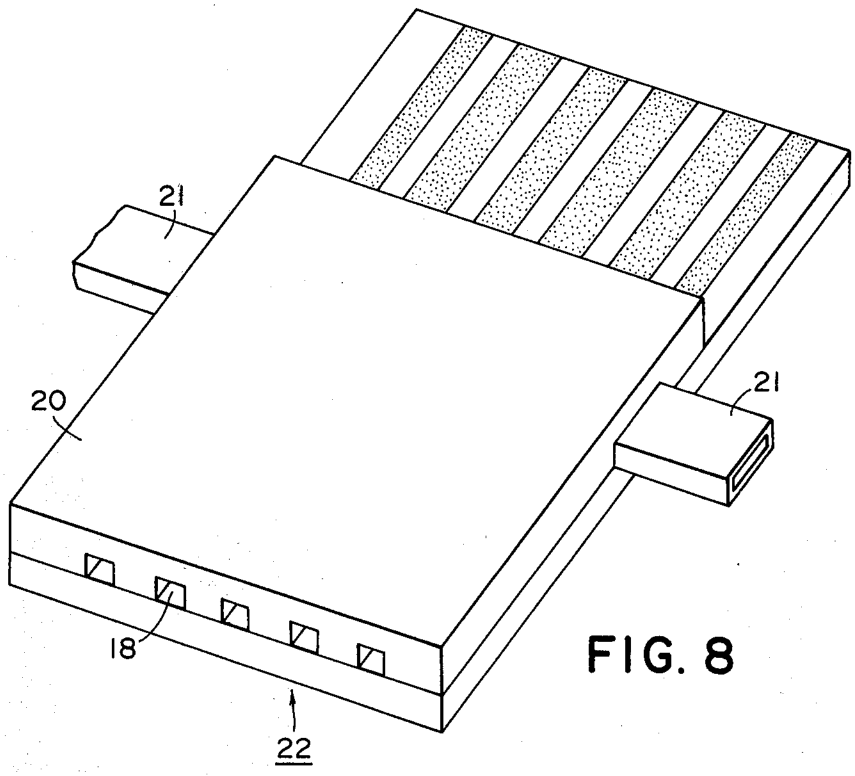

The thus manufactured heat-generating section setting base plate and the grooved plate are put together by registering the heat generating section and the grooves, to which an ink inlet tube 21 for introducing ink from an ink feeding section (not shown) to the common ink chamber 19 is connected, whereby an integral recording head block 22, as shown in FIG. 8, is completed.

Further, a lead base plate having electrode leads (common electrode lead and selective electrode lead) connected to the abovementioned selective electrodes and the common electrode is attached to this block 22. Next, as the condition for discharging experiments, a voltage pulse of 40 V with a pulse width of 10μ sec. (rising of 100 n sec. and trailing of 100 n sec.) and a repetition cycle of 2 KHz is applied to the heat generating resistive body through the electrode leads. Composition of the ink used for the experiment is as follows:

| | |
|---|---|
| Water | 70 wt. % |
| Diethylene glycol | 29 wt. % |
| Black dye | 1 wt. % |

When the ink droplets discharge experiments are conducted under the abovementioned discharge experiment conditions and using the ink composition, excellent results are obtained in respect of the discharge energy efficiency and the durability, as consolidated in Table 2 below. The recording property of the device is also excellent.

Evaluation of the durability in Examples 1 to 8 and Comparative Example 1 is as follows, in terms of possible number of times for repetitive application of electrical pulses.

| Standard for Evaluation of Durability |
|---|
| A . . . . . $10^9$ times or more |
| B . . . . . $10^8$ to $10^9$ times |
| C . . . . . $10^5$ time or less |

TABLE 1

| Example No. | Surface Layer Treatment: Method of Treatment | Surface Layer Treatment: Material Used for Treatment | Coarseness of Surface Layer |
|---|---|---|---|
| 1 | Sand Blast | Abrasive (Tradename: "Fujimi Abrasive A #1000") | 0.3S |
| 2 | " | Abrasive (Tradename: "Fujimi Abrasive A #600") | 0.2S |
| 3 | Buff | Abrasive (Tradename: "Cerox" product of Tohoku Kagaku Kinzoku K. K.) | 0.4S |
| 4 | " | Abrasive (Tradename: "Carborundum" supplied by Nagoya Kenmazai K. K.) | 0.1S |
| 5 | Spray | Ethanol solution of ethyl silicate ($SiO_2$) | 0.2S |

TABLE 1-continued

| Example No. | Surface Layer Treatment: Method of Treatment | Material Used for Treatment | Coarseness of Surface Layer |
|---|---|---|---|
| 6 | " | Ethanol Solution of alkyl titanate ($TiO_2$) | 0.05S |
| 7 | Etching | Permalloy Fluoric acid (etchant) | 1.8S |
| 8 | " | Titanium Fluoric acid (etchant) | 0.8S |
| Comparative Example 1 | | No treatment | 2.5S |

TABLE 2

| Example No. | Threshold Power for Droplet Discharge | Durability of Recording Head |
|---|---|---|
| 1 | 0.12 mJ/l pulse | A |
| 2 | 0.13 mJ/l pulse | A |
| 3 | 0.10 mJ/l pulse | A |
| 4 | 0.12 mJ/l pulse | A |
| 5 | 0.15 mJ/l pulse | A |
| 6 | 0.19 mJ/l pulse | A |
| 7 | 0.17 mJ/l pulse | B |
| 8 | 0.21 mJ/l pulse | A |
| Comparative Example 1 | 0.35 mJ/l pulse | C |

From the above-presented experiment results, it is understood that, when the predetermined treatments are given to the abovementioned protective layer, the threshold value of the electric power for the ink droplets discharge can be made small (in other words, the energy efficiency can be increased), and, at the same time, durability of the recording head device can be sufficiently increased to a practical level.

EXAMPLES 9 TO 12

First of all, the heat generating section setting base plate for use in Examples 9 to 12 are Comparative Examples 2 to 4 are prepared in the following manner. Incidentally, FIG. 6A shows an enlarged perspective view of the base plate.

An $SiO_2$ heat accumulating layer 13 (5 μm thick), and an $HfB_2$ heat generating resistive body layer 14 (800 Å thick) are sequentially formed on a silicon wafer 12 by sputtering under the condition as described in Table 3 below.

After an aluminum electrode layer 15 (5,000 Å thick) has been formed, a heat generating section 14' (40 μm wide and 200 μm long) is formed by selective etching. Also, selective electrodes 15*a* and a common electrode 15*b* are formed by the etching. Further, as shown in FIG. 6B, a protective layer 16 is laminated by sputtering under the conditions as described in Table 3 below.

In this manner, the heat generating section setting base plate for use in Examples 9 to 12 and Comparative Examples 2 to 4 is obtained.

Incidentally, the surface coarseness of the top surface layer of each heat generating section setting base plate is measured in accordance with JIS B 0601, the measured values being also included in the Table 3 below.

Separate from this, a plurality of grooves 18 (40 μm wide and 40 μm deep) and a groove to constitute a common ink chamber 19 are formed by using a microcutter, thereby manufacturing a grooved plate 20.

The thus obtained heat generating section setting base plate and the grooved plate are joined together upon registration of the heat generating section and the grooves. Thereafter, an ink inlet tube 21 for introducing ink into the common ink chamber 19 from an ink feeding section (not shown) is connected to this combination of the heat generating section setting base plate and the grooved plate, thereby completing a recording head block 22 as shown in FIG. 8.

Further, a lead base plate having electrode leads (common electrode lead and selective electrode lead) connected to the above mentioned selective electrodes and the common electrode are provided on this block 22. Next, as the conditions for ink discharging experiments, a voltage pulse 40 V with a pulse width of 10μ sec. (rising of 100 n sec. and trailing of 100 n sec.) and a repetition cycle of 2 KHz is applied to the heat generating resistive body through the electrode leads. Composition of the ink used for the experiment is as follows.

| | |
|---|---|
| Water | 70 wt. % |
| Diethylene glycol | 29 wt. % |
| Black dye | 1 wt. % |

When the ink droplets discharge experiments are conducted under the abovementioned discharging conditions and using the ink composition, excellent results are obtained in respect of the discharge energy efficiency and the durability, as consolidated in Table 4 below. The recording property of the device is also excellent.

Evaluation of the durability in Examples 9 to 12 and the Comparative Examples 2 to 4 is as follows, in terms of possible number of times for repetitive application of electrical pulses.

| Standard for Evaluation of Durability |
|---|
| A . . . . . $10^9$ times or more |
| B . . . . . $10^8$ to $10^9$ times |
| C . . . . . $10^5$ time or less |

TABLE 3

| Example No. | Forming Method of Vacuum Thin Film | Heat Accumulating Layer ($SiO_2$) | Heat Generating Register Layer ($HfB_2$) | Protective Layer ($SiO_2$) | Surface coarseness |
|---|---|---|---|---|---|
| 9 | Sputtering gas | Argon gas | Argon gas | Argon gas | 0.06S |
| | SP power | 900mW | 400mW | 900mW | |
| | SP pressure | $3 \times 10^{-3}$ Torr | $2 \times 10^{-2}$ Torr | $3 \times 10^{-3}$ Torr | |
| | substrate temperature | 300° C. | 100° C. | 300° C. | |
| 10 | Sputtering gas | Argon gas | Argon gas | Argon gas | 0.08S |
| | SP power | 2KW | 800mW | 2KW | |
| | SP pressure | $3 \times 10^{-3}$ Torr | $2 \times 10^{-2}$ Torr | $3 \times 10^{-3}$ Torr | |
| | substrate | 300° C. | 100° C. | 300° C. | |

TABLE 3-continued

| Example No. | | Forming Method of Vacuum Thin Film: Heat Accumulating Layer ($SiO_2$) | Heat Generating Register Layer ($HfB_2$) | Protective Layer ($SiO_2$) | Surface coarseness |
|---|---|---|---|---|---|
| | temperature | | | | |
| 11 | Sputtering gas | Argon gas | Argon gas | Argon gas | 0.2S |
| | SP power | 900mW | 400mW | 900mW | |
| | SP pressure | $3 \times 10^{-3}$ Torr | $2 \times 10^{-2}$ Torr | $3 \times 10^{-3}$ Torr | |
| | substrate temperature | Cooling with water | 100° C. | Cooling with water | |
| 12 | Sputtering gas | Helium gas | Helium gas | Helium gas | 0.05S |
| | SP power | 900mW | 400mW | 900mW | |
| | SP pressure | $3 \times 10^{-3}$ Torr | $2 \times 10^{-2}$ Torr | $3 \times 10^{-3}$ Torr | |
| | substrate temperature | 300° C. | 100° C. | 300° C. | |
| Comparative Example 2 | Sputtering gas | Nitrogen gas | Nitrogen gas | Nitrogen gas | |
| | SP power | 900mW | 500mW | 1KW | |
| | SP pressure | $3 \times 10^{-3}$ Torr | $2 \times 10^{-2}$ Torr | $3 \times 10^{-3}$ Torr | 3S |
| | substrate temperature | 400° C. | 300° C. | 400° C. | |
| Comparative Example 3 | Sputtering gas | Argon gas | Argon gas | Argon gas | |
| | SP power | 150mW | 150mW | 150mW | |
| | SP pressure | $3 \times 10^{-3}$ Torr | $2 \times 10^{-2}$ Torr | $3 \times 10^{-3}$ Torr | 2.5S |
| | substrate temperature | 400° C. | 100° C. | 300° C. | |
| Comparative Example 4 | Sputtering gas | Argon gas | Argon gas | Argon gas | |
| | SP power | 900mW | 400mW | 900mW | 0.02S |
| | SP pressure | $3 \times 10^{-3}$ Torr | $2 \times 10^{-2}$ Torr | $3 \times 10^{-3}$ Torr | |
| | substrate temperature | 300° C. | 100° C. | 300° C. | |

Note:
In the Comparative Example 4, a stainless steel base plate is used in place of silicon wafer.

TABLE 4

| Example No. | Durability of Recording Head | Threshold Power for Droplet Discharge |
|---|---|---|
| 9 | A | 0.13 mJ/1 pulse |
| 10 | A | 0.14 mJ/1 pulse |
| 11 | A | 0.13 mJ/1 pulse |
| 12 | A | 0.16 mJ/1 pulse |
| Comparative Example 2 | C | 0.25 mJ/1 pulse |
| Comparative Example 3 | B | 0.29 mJ/1 pulse |
| Comparative Example 4 | C | 0.32 mJ/1 pulse |

From the above-experimental results, it is seen that, when the vacuum deposition method is used for manufacturing the heat generating section, and this section has its interface with the ink coarsened to a predetermined range of values, the threshold value of the electric power for the ink droplets discharge can be made small (in other words, the energy efficiency can be increased), and, at the same time, durability of the recording head device can be sufficiently increased to a practical level.

EXAMPLES 13 TO 21

First of all, the heat generating section setting base plate for use in Examples 13 to 21 and Comparative Examples 5 to 7 are manufactured in the following manner. Incidentally, FIG. 6A shows an enlarged perspective view of the base plate.

A plurality of numbers of the substrate 12 as specified in Table 5 below are prepared. Then, $SiO_2$ is sputtered onto each of the substrates 12 to a thickness of 5 μm to form a heat accumulating layer 13. Over this heat accumulating layer 13, there are sequentially laminated a sputtered film of $HfB_2$ as a heat generating resistive body layer 14 (2,000 Å thick) and a vacuum evaporated film of aluminum as an electrode layer 15 (5,000 Å thick). Thereafter, by selective etching, the heat generating sections 14' of a dimension of 40 μm wide×500 μm long is formed. Also, by etching, selective electrodes 15a and a common electrode 15b are formed as illustrated in the drawing. Finally, as shown in FIG. 6B, $SiO_2$ is sputtered to a thickness of 1.4 μm to form the protective layer 16. In this manner, the heat generating section setting base plate for use in the Examples 13 to 21 and the Comparative Examples 5 to 7 is manufactured.

Incidentally, the surface coarseness of the protective layer 16 in the heat generating section 14' is measured for each of the base plate in accordance with JIS B 0601, and the measured values are shown in Table 5 below.

Separate from this, a plurality of grooves 18 (40 μm wide and 40 μm deep) and a groove to constitute a common ink chamber 19 are formed by using a microcutter, thereby manufacturing a grooved plate 20.

The thus obtained heat generating section setting base plate and the grooved plate are joined together upon registration of the heat generating section and the grooves. Thereafter, an ink inlet tube 21 for introducing ink into the common ink chamber 19 from an ink feeding section (not shown) is connected to this combination of the heat generating section setting base plate and the grooved plate, thereby completing a recording head block 22 as shown in FIG. 8.

Further, a lead base plate having electrode leads (common electrode lead and selective electrode lead) connected to the above mentioned selective electrode and the common electrode are provided on this block 22. Next, as the conditions for ink discharging experiments, a voltage pulse 40 V with a pulse width of 10 sec. (rising of 100 n sec. and trailing of 100 n sec.) and a repetition cycle of 2 KHz is applied to the heat generating resistive body through the electrode leads. Composition of the ink used for the experiment is as follows.

| | |
|---|---|
| Water | 70 wt. % |
| Diethylene glycol | 29 wt. % |
| Black dye | 1 wt. % |

When the ink droplets discharge experiments are conducted under the above mentioned discharging conditions and using the ink composition, excellent results are obtained in respect of the discharge energy efficiency and the durability, as consolidated in Table 4 below. The recording property of the device is also excellent.

Evaluation of the durability in Examples 9 to 12 and the Comparative Examples 2 to 4 is as follows, in terms of possible number of times for repetitive application of electrical pulses.

| Standard for Evaluation of Durability |
|---|
| A . . . . . $10^9$ times or more |
| B . . . . . $10^8$ to $10^9$ times |
| C . . . . . $10^5$ time or less |

TABLE 5

| Example No. | Constitution of Substrate: Material | Constitution of Substrate: Surface Coarseness | Surface Coarseness of Protective Layer |
|---|---|---|---|
| 13 | Grazed Ceramic (product of Kyoto Ceramics K.K.) | 0.2S | 0.1S |
| 14 | Fine Grain Alumina (product of Shinko Denki K.K.) | 1 S | 0.7S |
| 15 | Silicone Wafer (product of Nippon Denshi Kinzoku K.K.) | 0.1S | 0.1S |
| 16 | Stainless Steel Plate with Surface Roughening Treatment | 0.5S | 0.5S |
| 17 | Stainless Steel Plate with Surface Roughening Treatment | 2.5S | 2 S |
| 18 | Molten Quartz Plate with Surface Roughening Treatment | 0.4S | 0.2S |
| 19 | Molten Quartz Plate with Surface Roughening Treatment | 1.4S | 1.2S |
| 20 | Sapphire Plate with Surface Roughening Treatment | 0.5S | 0.3S |
| 21 | Sapphire Plate with Surface Roughening Treatment | 2 S | 1.4S |
| Comparative Example 5 | Stainless Steel Plate | 6 S | 5.5S |
| Cpmparative Example 6 | Aluminum Plate | 10 S | 9.1S |
| Comparative Example 7 | Quartz Glass Plate | 0.05S | 0.02S |

TABLE 6

| Example No. | Durability of Recording Head | Threshold Power for Droplet Discharge |
|---|---|---|
| 13 | A | 0.18 mJ/1 pulse |
| 14 | A | 0.10 mJ/1 pulse |
| 15 | A | 0.18 mJ/1 pulse |
| 16 | A | 0.20 mJ/1 pulse |
| 17 | A | 0.17 mJ/1 pulse |
| 18 | A | 0.19 mJ/1 pulse |
| 19 | A | 0.09 mJ/1 pulse |
| 20 | A | 0.20 mJ/1 pulse |
| 21 | A | 0.08 mJ/1 pulse |
| Comparative Example 5 | C | 0.25 mJ/1 pulse |
| Comparative Example 6 | C | 0.28 mJ/1 pulse |
| Comparative Example 7 | B | 0.35 mJ/1 pulse |

From the above-presented experimental results, it is understood that, when the heat generating section setting base plate manufactured in accordance with the present invention is used, the threshold value of the electric power for the droplets discharge can be made small (in other words, the energy efficiency can be increased), and, at the same time, durability of the recording head device can be sufficiently increased to a practical level.

Incidentally, the recording ink for use in the present invention can be prepared by dispersing or dissolving a wetting agent as exemplified by ethylene glycol, a surfactant, and various kinds of dyestuff in a principal solvent as exemplified by water, alcohol such as ethanol, or toluene.

In order not to clog the orifice of the discharge nozzle, it is effective to filter the recording ink after its preparation, or to provide a filter in the flow path of the ink, and other contrivances, as is the case with existing ink jet recording method.

As stated in the foregoing, according to the present invention, there can be provided the droplets forming device which can be operated stably to discharge droplets with low power consumption and is capable of producing a recorded image of good quality at high speed.

I claim:

1. A droplets forming device comprising means defining a chamber into which a liquid is introduced, said chamber being in communication with a liquid droplets discharging orifice, and heat generating means provided in a surface of said chamber defining means for heating the liquid so that the thus heated liquid is discharged from the orifice in the form of droplets, said heat generating means including at least a heat generating resistive body and a barrier layer to isolate said resistive body from the liquid in said chamber, and wherein the surface of said barrier layer in contact with the liquid has a surface coarseness of from 0.05 S to 2 S measured in accordance with Japanese Industrial Standard JIS B 0601.

2. The droplets forming device according to claim 1, wherein said heat generating resistive body is a film formed by the vacuum deposition method.

3. The droplets forming device according to claim 1, wherein said heat generating resistive body has a film thickness in a range of from 1,000 Å to 4,000 Å.

4. The droplets forming device according to claim 1, wherein said barrier layer has a film thickness of from 0.1 $\mu$m to 5 $\mu$m.

5. The droplets forming device according to claim 1, wherein the top surface of said barrier layer is coarsened.

6. The droplets forming device according to claim 1, wherein said barrier layer consists of an inorganic substance.

7. The droplets forming device according to claim 1, wherein said barrier layer includes a film made of a material selected from the group consisting of $SiO_2$, MgO, $Al_2O_3$, $Ta_2O_5$, $TiO_2$ and $ZrO_2$.

8. The droplets forming device according to claim 1, wherein said barrier layer is in a laminated structure.

9. The droplets forming device according to claim 1, wherein said barrier layer is laminated on said heat generating resistive body at said heat generating means.

10. The droplets forming device according to claim 1, wherein said heat generating section is provided on a base plate having a surface coarseness of from 0.1 S to 5 S measured in accordance with the Japanese Industrial Standard JIS B 0601.

11. A droplets forming device comprising means defining a chamber into which a liquid is introduced, said chamber being in communication with a liquid droplets discharging orifice, and heat generating means provided in a surface of said chamber defining means for heating the liquid so that the thus heated liquid is discharged from the orifice in the form of droplets, said heat generating means including a lamination of a plurality of films formed by vacuum deposition, and wherein the surface of the film in contact with the liquid has a surface coarseness of from 0.05 S to 2 S measured in accordance with the Japanese Industrial Standard JIS B 0601.

12. The droplets forming device according to claim 11, wherein said heat generating means has a heat generating resistive body layer and a barrier layer to isolate said heat generating resistive body layer from the liquid.

13. The droplets forming device according to claim 11, wherein said heat generating means is provided on a base plate having a surface coarseness of from 0.1 S to 5 S in accordance with the Japanese Industrial Standard JIS B 0601.

14. The droplets forming device according to claim 12, wherein said heat generating resistive body layer has a film thickness of from 1,000 Å to 4,000 Å.

15. The droplets forming device according to claim 12, wherein said barrier layer has a film thickness of from 0.1 $\mu$m to 5 $\mu$m.

16. The droplets forming device according to claim 12, wherein said barrier layer consists of an inorganic substance.

17. The droplets forming device according to claim 12, wherein said barrier layer includes a film made of a material selected from group consisting of $SiO_2$, MgO, $Al_2O_3$, $Ta_2O_5$, $TiO_2$, $ZrO_2$.

18. A droplets forming device comprising means defining a chamber in which a liquid is introduced, said chamber being in communication with a liquid droplets discharging orifice, and heat generating means provided in a surface of said chamber defining means for heating the liquid so that the thus heated liquid is discharged from the orifice in the form of droplets, said heat generating means including a heat generating resistive body layer formed on a base plate, and wherein said base plate has a surface coarseness of from 0.1 S to 5 S measured in accordance with the Japanese Industrial Standard JIS B 0601.

19. The droplets forming device according to claim 18, wherein said base plate consists of a sintered polycrystalline body.

20. The droplets forming device according to claim 18, wherein said base plate is made of metals, molten quartz, or sapphire, the surface of which has been subjected to coarsening treatment.

21. The droplets forming device according to claim 18, wherein said heat generating resistive body layer consists of a film formed by vacuum deposition.

22. The droplets forming device according to claim 18, wherein said heat generating resistive body layer has a film thickness of from 1,000 Å to 4,000 Å.

23. The droplets forming device according to claim 18, wherein the outer surface of said heat generating means has a surface coarseness of from 0.05 S to 2 S measured in accordance with the Japanese Industrial Standard JIS B 0601.

24. The droplets forming device according to claim 18, wherein said heat generating resistive body layer is covered with a barrier layer consisting of an inorganic substance to isolate the heat generating resistive body layer from the liquid.

25. The droplets forming device according to claim 24, wherein said barrier layer is a film formed by vacuum deposition.

26. The droplets forming device according to claim 18, wherein a heat accumulating layer is interposed between the surface of said base plate and said heat generating resistive body layer.

27. The droplets forming device according to claim 26, wherein said heat accumulating layer has a thickness of from 0.01 $\mu$m to 50 $\mu$m.

* * * * *

UNITED STATES PATENT AND TRADEMARK OFFICE

CERTIFICATE OF CORRECTION

PATENT NO. : 4,336,548

DATED : June 22, 1982

INVENTOR(S) : SHIGEYUKI MATSUMOTO

It is certified that error appears in the above-identified patent and that said Letters Patent is hereby corrected as shown below:

Column 1, line 20, delete "recording" after "speed";
line 33, "type" should read --types--;
line 49, delete ";" after "ink" (first occurrence);
line 50, insert --;-- after "ink" (second occurrence);
insert --a-- after "ink".

Column 2, line 11, after "respectively" insert --the--;
line 14, "an" should read --on--;
line 15, after "occur" delete "readily";
line 66, insert --a-- after "of"(first occurrence);

Column 6, line 49, "those compound" should read --Those compounds--; "Wi-Cr" should read --W,Ni-Cr--.

Column 7, line 6, "A to" should read --Å to--;
line 66, "articls" should read --articles; after "under" change "a" to --the--.

UNITED STATES PATENT AND TRADEMARK OFFICE

CERTIFICATE OF CORRECTION

PATENT NO. : 4,336,548

DATED : June 22, 1982

INVENTOR(S) : SHIGEYUKI MATSUMOTO

It is certified that error appears in the above-identified patent and that said Letters Patent is hereby corrected as shown below:

Column 15, line 55, in Table 5, under Example No., under Example 5, change "Cpmpara-" to-- Compara- --.

Signed and Sealed this

*Thirtieth* Day of *November 1982*

[SEAL]

*Attest:*

GERALD J. MOSSINGHOFF

*Attesting Officer* *Commissioner of Patents and Trademarks*